United States Patent [19]

Komatsu et al.

[11] Patent Number: 5,162,943
[45] Date of Patent: Nov. 10, 1992

[54] IMAGE READING APPARATUS WITH A DIFFRACTION GRATING

[75] Inventors: Katsuaki Komatsu; Shinichi Nishi, both of Hachoji, Japan

[73] Assignee: Konica Corporation, Tokyo, Japan

[21] Appl. No.: 699,645

[22] Filed: May 14, 1991

[30] Foreign Application Priority Data

May 16, 1990 [JP] Japan .................... 2-126070

[51] Int. Cl.$^5$ ............................. G02B 27/44
[52] U.S. Cl. ......................... 359/571; 359/569; 359/574; 250/226
[58] Field of Search ............. 369/108, 109; 250/226, 250/208.1; 359/566, 568, 569, 570, 571, 574, 576, 575

[56] References Cited

U.S. PATENT DOCUMENTS

| | | | |
|---|---|---|---|
| 4,204,881 | 5/1980 | McGrew | 359/571 X |
| 4,246,338 | 1/1981 | Kaplan | 359/575 X |
| 4,277,138 | 7/1981 | Dammann | 359/569 |
| 5,113,067 | 5/1992 | Nakai et al. | 250/208.1 |

FOREIGN PATENT DOCUMENTS 61-45210 10/1986 Japan .

OTHER PUBLICATIONS

Dammann, H. "Color Separation Grating" *Applied Optics*, vol. 17, No. 15 Aug. 1, 1978, pp. 2273-2279.

*Primary Examiner*—Bruce Y. Arnold
*Assistant Examiner*—David R. Parsons
*Attorney, Agent, or Firm*—Finnegan, Henderson Farabow, Garrett and Dunner

[57] ABSTRACT

An image reading apparatus including a diffraction grating element including a transparent plate shaped in the form of consecutive steps to separate a light reflected from a document into a zero order light, −1 order light, and +1 order light. The transparent plate is arranged so that the zero order light has a wavelength in a blue region and +1 order light and −1 order light have wavelengths either in green and red regions, respectively or in red and green regions, respectively.

4 Claims, 3 Drawing Sheets

SCANNING DIRECTION

SCANNING DIRECTION

IMAGE READING APPARATUS WITH A DIFFRACTION GRATING

BACKGROUND OF THE INVENTION

The present invention relates to an image reading apparatus with a diffraction grating, and particularly, to an image reading apparatus of a line reading type which comprises a heat radiation type light source, a diffraction grating for color separation, and a line sensor having three reading lines.

In the conventional image reading apparatus with a diffraction grating of a line reading type, when color images in a line on document 1 are optically guided, through lens 2, slit 3 and lens 4, into diffraction grating 5 for color separation, in such an arrangement as shown in FIG. 4, for example, the images are color-separated by the diffraction grating 5 into R(red), G(green) and B(blue) which can be read by the line sensor 6 having three reading lines. The slit 3 is used for restricting the reading width in the scanning direction and thereby for preventing the so-called crosstalk which means that image information from other scanning lines enter the currently scanning line as a noise.

As the diffraction grating 5 which is a color separation element of the above-mentioned apparatus, there is known the diffraction grating element disclosed for example, in Japanese Patent Examined Publication No. 45210/1986.

This diffraction grating element is constructed so that, as shown in FIG. 2, the thickness of a transparent plate such as a glass plate or the like forms steps repeatedly changed along one direction of the plate surface. The difference of thickness of the steps is formed so that the difference in the length of optical paths which is calculated by the multiplication of a selected wavelength by an integer, is produced. For example, the plate thickness is changed in three steps so that color component images of R(red), G(green), and B(blue) can be formed and a zero order green image can be formed on the central optical axis.

As a light source of a conventional color image reading apparatus, the so-called heat radiation type light source is most widely used, in which a filament of a halogen lamp or the like is heated by an electric current running through the filament and light is emitted by the heat radiation.

The heat radiation type light source has advantages in that it is inexpensive, easily available, and it requires no special circuit for lighting.

However, it has disadvantages in that it has the maximum value in the infrared region of the wavelength of about 1 $\mu$m, and has the minimum light intensity in the blue region in its spectral distribution characteristics. Further, in the light separation by the diffraction grating element shown in FIG. 2, only a portion of a spread of $\pm 1$ order diffracted light can be received in comparison with the light receiving of the zero order diffracted light, because a light receiving width of the line sensor 6 is limited. Accordingly, it has the characteristics in which the quantity of the received light becomes small. Consequently, when the diffraction grating element wherein the light in a blue region is $\pm 1$ order diffracted light, and a heat radiation type light source are combined, a photoelectric output in the blue region is extremely smaller than those in green and red regions. As a result, there is a problem that a well-balanced image signal can not be obtained.

An object of the present invention is to solve the above-mentioned problems, to improve the insufficient sensitivity in the blue region, and to provide an image reading apparatus in which the well-balanced image signal can be obtained.

SUMMARY OF THE INVENTION

The above-mentioned object can be accomplished by an image reading apparatus, which is characterized in that: a reflected light from an original document illuminated by a heat radiation type light source is color-separated in such a manner that the zero order light of the reflected light belongs to a blue region and $\pm 1$ order light of the reflected light belong to a red region and a green region respectively, when using a diffraction grating element which has three consecutive steps repeatedly formed in the thickness of a transparent base plate; and the diffracted light is read out by focusing it on a line sensor having three reading lines, wherein the above-mentioned diffraction grating element comprises an element which has three consecutive steps repeatedly formed in the thickness of the plate, and wherein, when the index of refraction of the transparent base plate is defined as n, the difference d of thickness of the steps adjoining each other is within the range indicated as follows, $$0.8/(n-1) \leq d \leq 1/(n-1).$$

DETAILED DESCRIPTION OF THE PREFERRED EMBODIMENT

Figure 1:
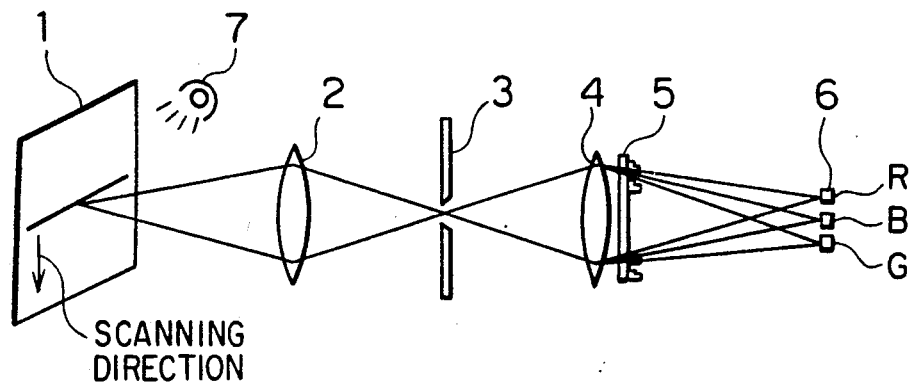
FIG. 1 is a diagram which shows a composition of an example of the present invention.

Referring to the drawings, the preferred embodiments of the present invention will be explained as follows.

Figure 2:
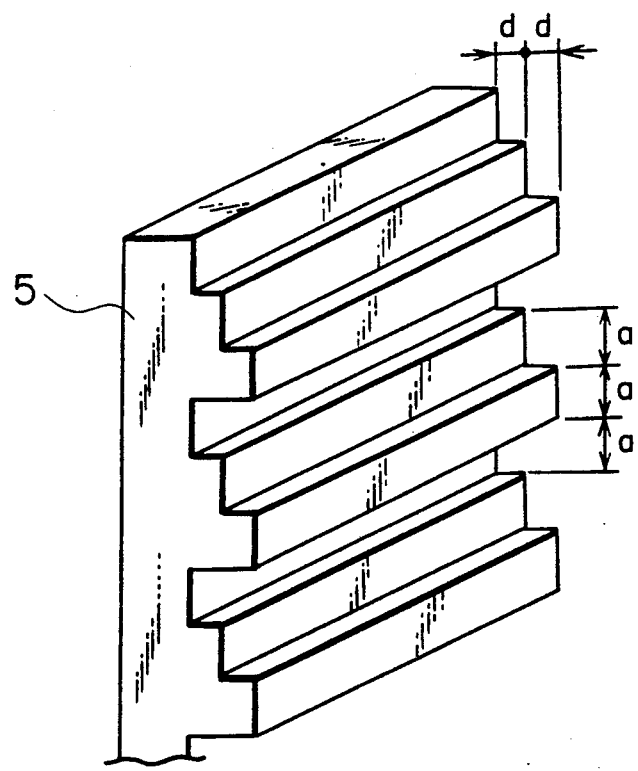
FIG. 2 is an enlarged sectional view of a diffraction grating in FIG. 1, FIGS. 3 (a) and (b) are graphs which show relations between a peak wavelength of diffracted light and height of each step.
Figure 4:
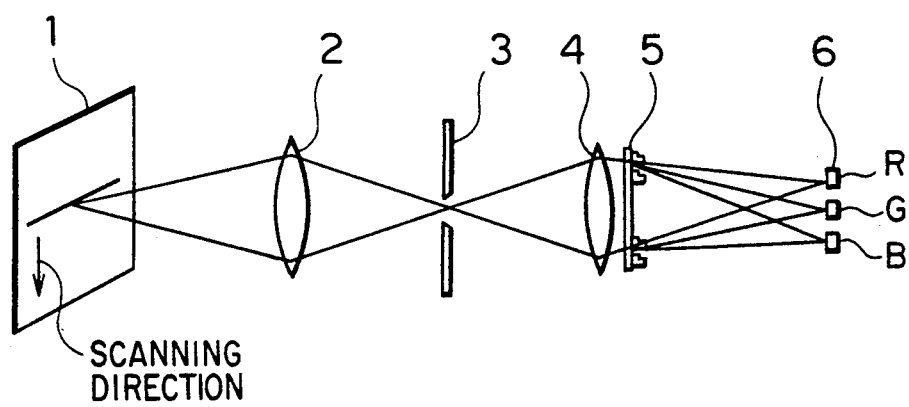
FIG. 4 is a diagram which shows a conventional image reading apparatus of a line reading type.

FIG. 1 is a composition diagram which shows an example of the present invention, and FIG. 2 is an enlarged sectional view of a diffraction grating in FIG. 1. In the drawings, numeral 7 is a halogen lamp which is a heat radiation type light source to illuminate an original document 1, and elements identical to those shown in FIG. 4 are given the same symbols and their explanations are omitted.

In FIG. 2, a is a width of a step portion of diffraction grating 5, and d is a difference in thickness of the steps adjoining each other.

One of the features of the present invention is that the diffraction grating is constructed so that zero order light of the diffraction grating 5 as a diffraction grating element, is made blue light. When a difference in thickness per one step is defined as d, the number of the order of the diffracted light is defined as q, the total number of steps of the diffraction grating is defined as P (in the example in FIG. 2, P=3), and the index of refraction of the step portion is defined as n, a peak wavelength $\lambda_p$ of the diffracted light caused by the diffraction grating in which the thickness of a transparent base plate is repeatedly changed in the form of steps is defined in the following equation by an approximation;

$$\lambda_p = (n-1)d/(k-q/P) \quad (1)$$

where k is a natural number (k=1, 2, 3, ...).

Figure 3:
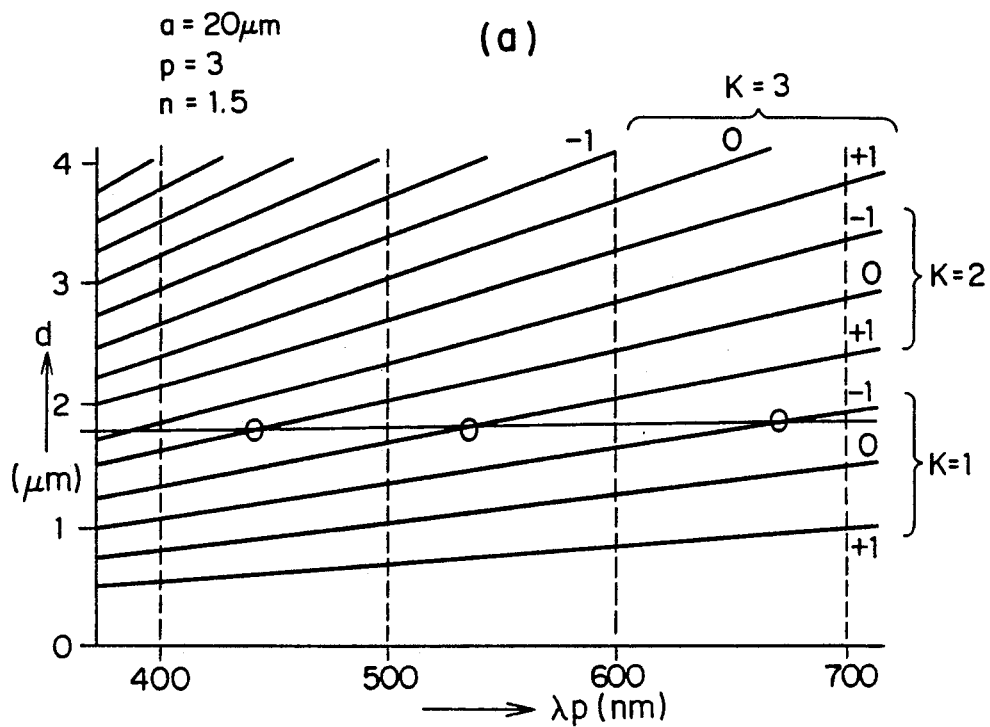
Figure 3:
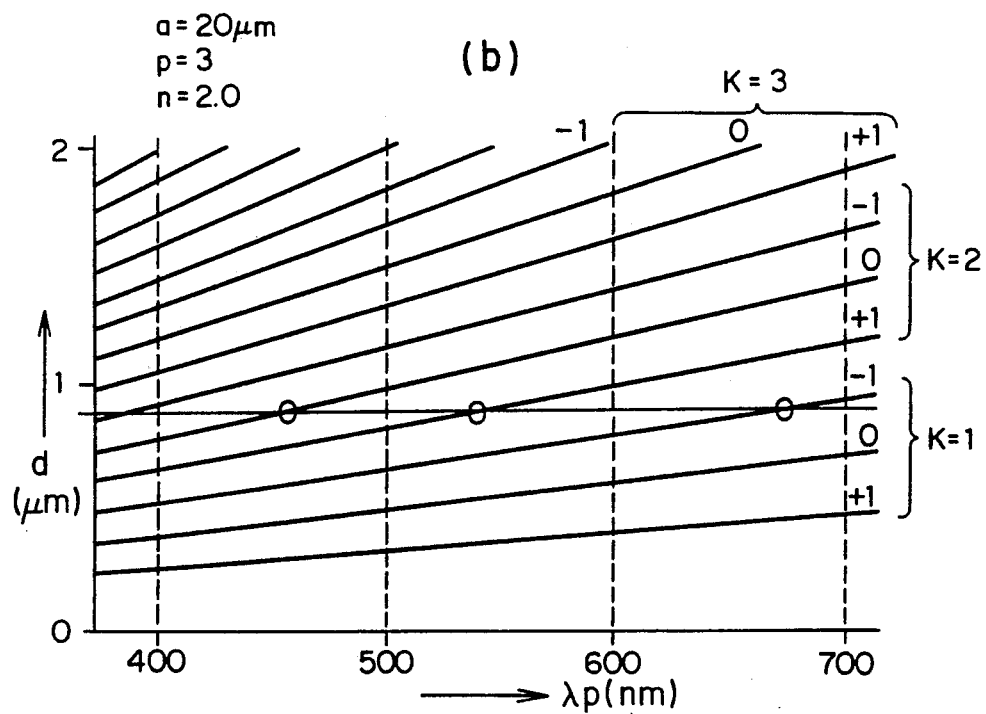

When the diffraction grating is formed into steps using $SiO_2$ (n=1.5) or $Si_3N_4$ (n=2.0) on a glass plate, and width a of the step is defined as 20 μm, relations in the equation (1) of the diffraction grating are shown by the graphs in FIGS. 3(a) and (b). FIG. 3(a) shows the case in which $SiO_2$ is used, and FIG. 3(b) shows the case in which $Si_3N_4$ is used. According to the graphs, when $SiO_2$ (n=1.5) is used and the difference d in thickness of the steps is 1.8 μm, a peak wavelength $\lambda_p$ of the zero order light in the case of k=2 is 450 nm, a peak wavelength of +1 order light in the case of k=2 is 540 nm, and a peak wavelength of −1 order light in the case of k=1 is 675 nm. When $Si_3N_4$ (n=2.0) is used and d=0.90 μm, a peak wavelength $\lambda_p$ of the zero order light in the case of k=2 is 450 nm, a peak wavelength $\lambda_p$ of +1 order light in the case of k=2 is 540 nm, and a peak wavelength of −1 order light in the case of k=1 is 675 nm. In all cases mentioned above, the diffracted light can be separated so that light in a blue region may be sandwiched between light in a red region and light in a green region.

Needless to say, the peak wavelength $\lambda_p$ can be caused to deviate back and forth by the adjustment of the change in thickness (height) of the step, and d can be changed within the following range from the equation (1).

When the diffraction grating 5 is constructed in three steps (P=3) which is the simplest embodiment in the term of construction, $\lambda_p = 400$ to 500 nm (the blue region), q=0, and k=2, the value of d is as follows:

$$0.8/(n-1) \leq d \leq 1/(n-1) \quad (\mu m)$$

that is to say, when n is 1.5, d is 1.6 to 2 μm, and when n is 2.0, d is 0.8 to 1 μm.

An angle of diffraction, when the light is separated by the diffraction grating, is proportional to the inverse number of the width a of the step. Since d can not be made too much larger than a, the value of d which is small as mentioned above means that the value of a can be made fully small. Accordingly, the angle of diffraction can be sufficiently large, which offers an advantage in that the degree of selection freedom of d, can be large in the design work. Consequently, when the above, conditions are satisfied, the diffraction grating can be easily produced.

As explained above, the present invention carries out the spectral diffraction of light wherein light in a blue region that is order-zero light is sandwiched between light in a red region and light in a green region, so that the diffraction efficiency can be made maximum for the light in the blue region. Further, in a heat radiation type light source such as halogen light, the intensity of light in a red region is high, and a sensor CCD generally has a peak value of the sensitivity in a green region. As a result, the present invention can provide an image reading apparatus in which the image signals of red (R), blue (B), and green (G) obtained from a line sensor are well-balanced in terms of intensity to be close to 1:1:1.

What is claimed is:

1. An image reading apparatus, comprising:
   a heat radiation type light source for irradiating a document to cause the document to reflect image light, the light source having a light intensity distribution in which light having a wavelength in a blue light region has a lower intensity than light having a wavelength in either a red light region or a green light region;
   a slit member having a slit, for receiving the image light reflected from the document and for allowing only a line of the image light to pass through the slit;
   a diffraction grating element including a transparent plate for diffracting the line of the image light into three lines of zero order light, −1 order light, and +1 order light, and for directing each of the three lines of light onto one of three predetermined positions that are displaced from one another, the transparent plate having a thickness that varies in consecutive steps, wherein the consecutive steps are arranged so that zero order light has a wavelength in the blue light region and +1 order light and −1 order light have wavelengths either in the green light region and the red light region, respectively, or in the red light region and the green light region, respectively; and
   three image reading means each for reading light in a respective one of the blue, red, and green light regions, wherein the image reading means for reading light in the blue light region is positioned to read only zero order light and the image reading means for reading light in the red light region and green light region are positioned to read only +1 order light and −1 order light, or −1 order light, and +1 order light, respectively.

2. The apparatus of claim 1, wherein the diffraction grating element includes three consecutive steps.

3. The apparatus of claim 2, wherein the difference d in thickness in micrometers between adjacent steps satisfies the following condition:

$$0.8/(n-1) \leq d \leq 1/(n-1),$$

wherein n is the index of refraction of said transparent plate.

4. An image reading apparatus, comprising:
   a light source for irradiating a document;
   a diffraction grating element including a transparent plate for separating light reflected from said document into zero order light, −1 order light, and +1 order light, the transparent plate having a thickness that varies in consecutive steps, wherein the consecutive steps are arranged so that zero order light has a wavelength in a blue light region and +1 order light and −1 order light have wavelengths either in green and red light regions, respectively, or in red and green light regions, respectively; and
   means for reading zero order light, −1 order light, and +1 order light and generating an electrical signal.

* * * * *

UNITED STATES PATENT AND TRADEMARK OFFICE
CERTIFICATE OF CORRECTION

PATENT NO. : 5,162,943
DATED : November 10, 1992
INVENTOR(S) : Katsuaki Komatsu et al.

It is certified that error appears in the above-identified patent and that said Letters Patent is hereby corrected as shown below:

Inventors, Title page, item [75], change "Hachoji" to --Hachioji--; and

Claim 1, Column 4, Line 37, before "or" insert --respectively,--.

Signed and Sealed this

Fourth Day of January, 1994

Attest:

BRUCE LEHMAN

Attesting Officer Commissioner of Patents and Trademarks